(12) United States Patent
van Walraven

(10) Patent No.: US 6,935,599 B2
(45) Date of Patent: Aug. 30, 2005

(54) HOOK CLOSURE AND PIPE CLIP WITH SUCH A HOOK CLOSURE

(75) Inventor: Jan van Walraven, Mijdrecht (NL)

(73) Assignee: Starquick International Ltd., Wolfenschiessen (CH)

( * ) Notice: Subject to any disclaimer, the term of this patent is extended or adjusted under 35 U.S.C. 154(b) by 0 days.

(21) Appl. No.: 10/351,746

(22) Filed: Jan. 27, 2003

(65) Prior Publication Data

US 2003/0164430 A1 Sep. 4, 2003

Related U.S. Application Data

(63) Continuation-in-part of application No. PCT/NL01/00572, filed on Jul. 24, 2001.

(30) Foreign Application Priority Data

Jul. 27, 2000 (NL) .............................................. 105823

(51) Int. Cl.$^7$ ................................................. F16L 3/08
(52) U.S. Cl. ................... 248/74.1; 248/74.3; 24/16 PB; 403/339
(58) Field of Search ........................ 248/71, 74.1, 74.3, 248/68.1, 74.2; 24/16 PB; 403/339, 340

(56) References Cited

U.S. PATENT DOCUMENTS

| | | | | |
|---|---|---|---|---|
| 3,604,071 A | * | 9/1971 | Reimels ....................... | 24/543 |
| 4,212,303 A | * | 7/1980 | Nolan ......................... | 606/120 |
| 4,478,381 A | * | 10/1984 | Pittion et al. ................. | 248/71 |
| 4,502,186 A | * | 3/1985 | Clarke et al. ............. | 24/16 PB |
| 4,802,646 A | * | 2/1989 | Cattani ..................... | 248/316.5 |
| 4,840,345 A | * | 6/1989 | Neil et al. ................ | 248/74.2 |
| 4,908,911 A | * | 3/1990 | Bretti et al. .............. | 24/16 PB |
| 4,958,791 A | * | 9/1990 | Nakamura ................. | 248/74.1 |
| 5,022,126 A | * | 6/1991 | Davis .......................... | 24/543 |
| 5,118,215 A | | 6/1992 | Freier | |
| 5,277,387 A | | 1/1994 | Lewis et al. | |

FOREIGN PATENT DOCUMENTS

| | | |
|---|---|---|
| EP | 0 276 926 A1 | 3/1988 |
| GB | 1 600 605 A | 10/1981 |
| NL | 6 717 541 A | 6/1969 |
| WO | WO 99/08032 A1 | 2/1999 |

* cited by examiner

*Primary Examiner*—Korie Chan
(74) *Attorney, Agent, or Firm*—Browdy and Neimark, P.L.L.C.

(57) ABSTRACT

A pipe clip having a hook closure for connecting a first part to a second parts. The first part is provided with at least one outwardly directed hook member and the second part is provided with at least one inwardly directed hook member. Each hook member has a hook surface and another boundary surface such that when the hook is closed the hook members move towards each other in the direction of closing and pass each other until the hook surfaces of the inwardly and outwardly directed hook surfaces engage behind each other. In the closed position the boundary surfaces of the hook members hooked behind each other rest against each other. Each hook member is further provided with a locking facility such that when the hook is closed, mutual lateral shifting of the hook members is blocked. Each hook member is made of hook member halves lying side by side and adjoining each other. The halves are staggered slightly relative to each other so that each hook member half forms a hook surface half, and a first stop surface of the hook member extends between the hook surface halves situated staggered relative to each other. Each hook member half forms a boundary surface half, and a second stop surface of the hook member concerned extends between the boundary surface halves situated staggered relative to each other. When the hook is closed the stop surfaces block mutual lateral shifting of the hook members.

3 Claims, 4 Drawing Sheets

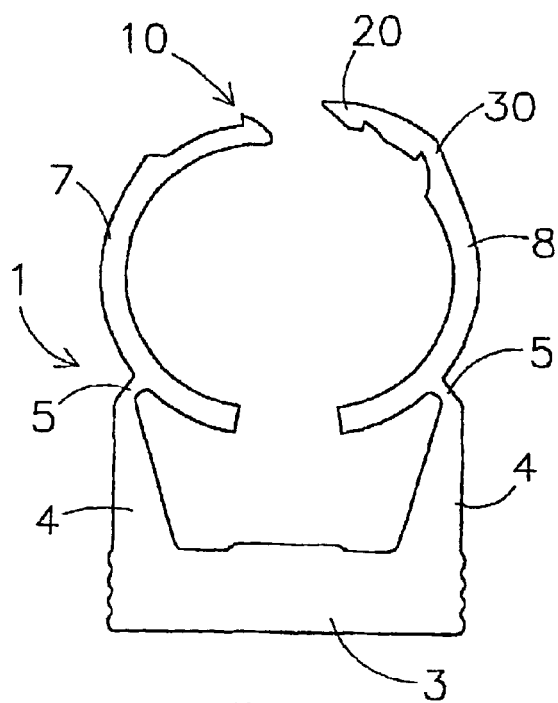
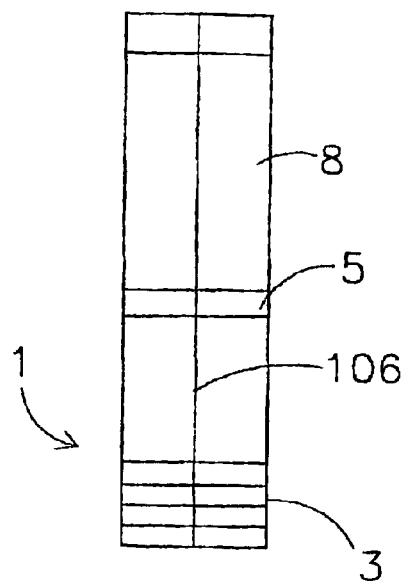
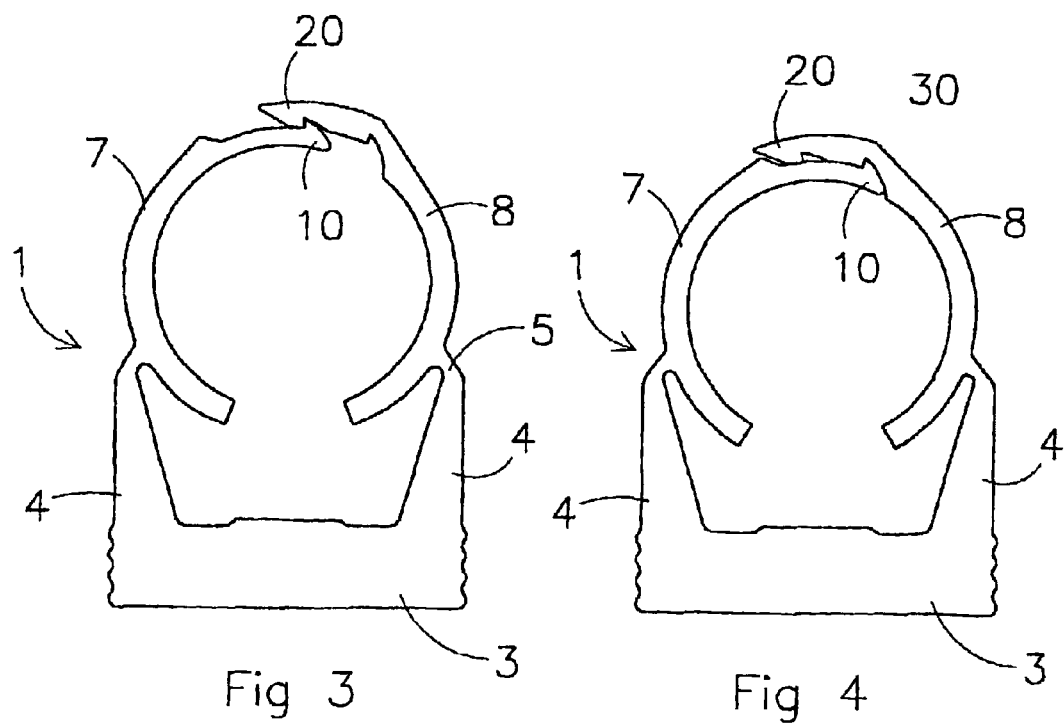

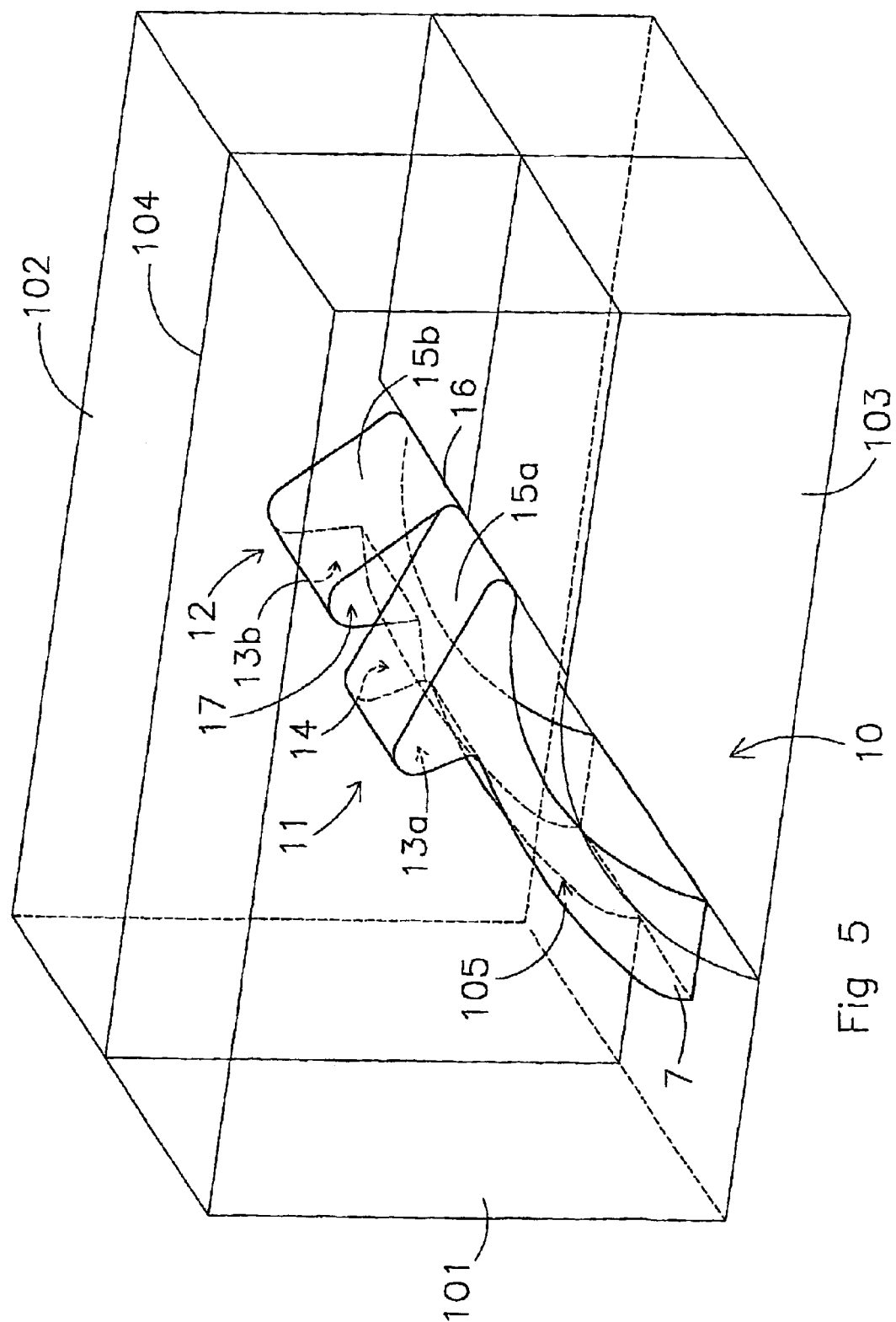

HOOK CLOSURE AND PIPE CLIP WITH SUCH A HOOK CLOSURE

This is a continuation-in-part of application No. PCT/NL01/00572, filed Jul. 24, 2001.

FIELD OF THE INVENTION

The invention relates to a pipe clip, in particular a plastic pipe clip produced by injection moulding, provided with a hook closure.

BACKGROUND

A pipe clip provided with a hook closure is described in NL-B-174 294. Typical of this known pipe clip is the fact that the clip segments enclose the pipe and are hooked together by means of the hook members, which form the hook closure, when a pipe is placed between the clip segments and the pipe is pressed towards the base part of the pipe clip.

An improvement of the abovementioned pipe clip is described by the present applicant in WO 99/08032. In that publication a pipe clip with a hook closure is explained with reference to FIGS. 3 and 4. In the case of this known hook closure provision is made for a blocking projection to be moulded on in the centre on top of the slanting run-on surface of the outwardly directed hook member, and provision is also made for the other clip segment near the inwardly directed hook member to be provided with a corresponding blocking recess. If this known hook closure is closed, the blocking projection projects into the corresponding blocking recess. As a result, mutual lateral shifting of the hook members in opposite directions in the plane of the hook surfaces, i.e. in the longitudinal direction of the pipe accommodated in the pipe clip, is blocked.

The plastic pipe clips according to NL-B-175 294 and WO 99/08032 are designed to be mass-produced, preferably by injection moulding in a suitably shaped injection mould.

A disadvantage of the known hook closure according to WO 99/08032 appears to be its producibility. In particular, it appears that the mould needed for the injection moulding of the pipe clip is complex and consequently expensive, in particular because of the design of its hook closure.

OBJECT OF THE INVENTION

An object of the present invention is to propose a pipe clip with a hook closure which can be produced in a technically and economically attractive way.

SUMMARY OF THE INVENTION

The present invention achieves the abovementioned object by providing a pipe clip having a hook closure of the type described above, wherein each hook member is composed of hook member halves lying side by side and adjoining each other, which halves are staggered slightly relative to each other, in such a way that each hook member half forms a hook surface half, and a first stop surface of the hook member concerned extends between the hook surface halves situated staggered relative to each other, and in such a way that each hook member half further forms a boundary surface half, and a second stop surface of the hook member concerned extends between the boundary surface halves situated staggered relative to each other, so that—in the closed state of the hook closure—the first stop surfaces block a mutual lateral shifting of the hook members in one direction and the second stop surfaces block a mutual shifting in the opposite direction.

In a preferred embodiment of the hook closure, provision is made for the hook member halves of the one or more hook members of the first part or of the second part to be staggered in such a way that the hook member halves each form a run-on surface half, the second stop surface of the hook member concerned extending between the staggered run-on surface halves, and provision is made for the hook member halves of the one or more hook members provided on the other part—viewed in the direction of closing, beyond the corresponding hook surface—to be staggered in such a way that the hook member halves each form a boundary surface half, the second stop surface of the hook member concerned extending between the staggered boundary surface halves.

With special preference, provision is made for the first and second stop surfaces of a hook member to extend in a single common plane. In a preferred embodiment, provision is made for the first part and the second part to be produced by injection moulding of plastic material in a suitable mould, which mould comprises a first mould part and a second mould part, which mould parts respectively define a mould cavity for the one hook member half and for the other hook member half of a hook member and during the injection moulding rest against each other by means of a partial face, the partial face coinciding with the common face of the first and the second stop surface of a hook member. This embodiment makes a simple and advantageous embodiment of the mould possible and gives excellent results during the injection moulding of the hook closure. The hook closure can in particular be produced at a high production speed.

In a particularly advantageous application, the hook closure is part of a plastic pipe clip.

The invention will be explained in greater detail below with reference to the drawing of a preferred embodiment of the pipe clip with a hook closure according to the invention.

BRIEF DESCRIPTION OF THE DRAWING

FIG. 1 shows in side view a pipe clip according to the invention, in the open position, FIG. 2 shows a front view of the pipe clip of FIG. 1, FIG. 3 shows in side view the pipe clip of FIG. 1 in a first closed position, FIG. 4 shows in side view the pipe clip of FIG. 1 in a second closed position, FIG. 5 shows diagrammatically in perspective the outwardly directed hook member of the left clip segment of the pipe clip visible in FIGS. 1, 3 and 4, the corresponding injection mould halves also being shown diagrammatically.

DESCRIPTION OF A PREFERRED EMBODIMENT

Figure 6:
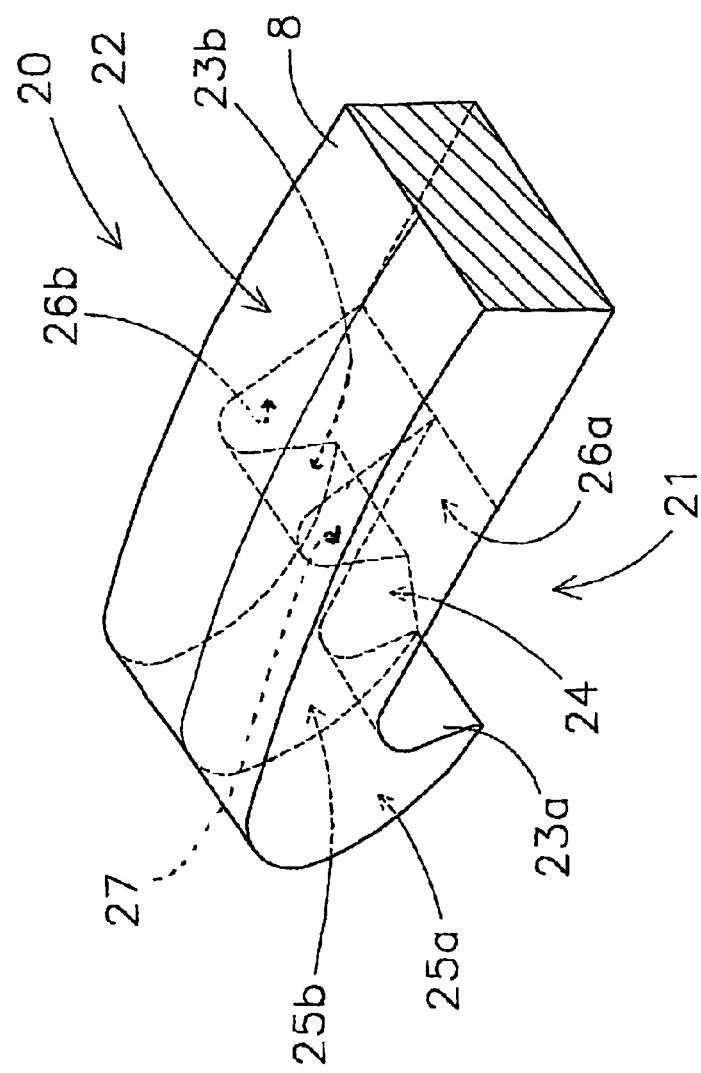
FIG. 6 shows diagrammatically in perspective the inwardly directed hook member on the end of the right clip segment of the pipe clip visible in FIGS. 1, 3 and 4.

The one-piece plastic pipe clip 1 shown in the drawing serves to fix a cylindrical pipe or the like to a support, for example a wall or a supporting structure.

The pipe clip 1 comprises a base part 3, which is designed for fixing the pipe clip 1 to the support. For example, the base part 3 can be provided in a known manner with an opening extending between the underside and the top side of the base part, and a transverse slit extending transversely to the opening. The transverse slit is designed to accommodate a metal nut, the threaded hole of which then lies in line with the opening. A bolt fitted on the wall or supporting structure can be inserted through the opening and screwed into the nut.

The base part 3 has two upright arms 4, each of which connects by way of a pivoting connecting part 5 to a clip segment 7, 8. Each pivoting connecting part 5 here forms a pivot axis, which in FIGS. 1, 4 and 3 lies perpendicular to the plane of the drawing. This means that the pivot axes of the pivoting connecting parts 5 are situated parallel to each other.

Each clip segment 7, 8 has a substantially semicircular bearing surface for the pipe, which bearing surface faces away from the other clip element.

The clip segments 7, 8 are fitted on the base part 3 by way of the pivoting connecting parts 5 in such a way that the clip segments 7, 8 enclose the pipe when the pipe is pressed towards the base part 3 between the clip segments 7, 8.

It can be seen in the drawing that on its end facing away from the base part 3 the clip segment 7 is provided with an outwardly directed hook member 10, and that on its end facing away from the base part 3 the other clip segment 8 is provided with an inwardly directed first hook member 20. The clip segment 8 is further provided with a second inwardly directed hook member 30, which lies closer to the pivoting connecting part 5, and which likewise can be brought into engagement with the hook member 10. FIGS. 3 and 4 show that in this way the pipe clip 1 has two closed positions for accommodating pipes of differing diameters.

When a pipe is pressed into the pipe clip 1, the two hook members 10, 20 or 10, 30 hook up behind each other.

The pivoting connections 5 are made here of the same injection mouldable plastic material as the clip segments 7, 8 and the base part 3 of the pipe clip 1. It is also conceivable for the pivoting connecting parts 5 to be made of another material. This is possible by, for example, making use of generally known multi-component injection moulding technology, in the case of which two or more different types of plastic are injected into the same mould. It is also possible first to produce the pivoting connecting parts 5 separately and subsequently to place these parts in an injection mould, after which the remaining parts of the pipe clip 1 are injected onto the pivoting connecting parts 5. Of course, the base part 3 and the clip segments 7, 8 can also be produced first, and these parts can then be placed in a suitable mould, after which the pivoting connections are injection moulded onto them.

The pipe clip 1 is produced here by means of injection moulding of suitable plastic material in an injection mould.

FIG. 5 shows the hook member 10 on an enlarged scale. The outwardly directed hook member 10 is formed on the end of the partially illustrated clip segment 7.

The hook member 10 is composed of two hook member halves 11, 12 lying side by side and adjoining each other, which hook member halves 11, 12 are staggered slightly relative to each other. Each hook member half 11, 12 forms a hook surface half 13a, 13b, which hook surface halves 13a, 13b extend transversely to the closing direction of the clip segments 7, 8.

The hook surface halves 13a, 13b are staggered relative to each other in the closing direction. Between the hook surface halves 13a, 13b the side edge of the hook member half 11 forms a first stop surface 14 of the hook member 10 concerned.

Each hook member half 11, 12 further forms a slanting run-on surface half 15a, 15b of the hook member 10. In this example said run-on surface halves 15a, 15b extend from a common rectilinear front edge 16 of the hook member 10, in this case the run-on surface 15b being slightly steeper than the run-on surface 15a. In a variant the front edge 16 has a step in the centre, and the inclines of the run-on surface halves 15a, 15b are equal.

A second stop surface 17 of the hook member 10 concerned extends between the run-on surface halves 15a, 15b situated staggered relative to each other.

The stop surfaces 14, 17 of the hook member 10 extend in a common imaginary plane.

The hook member 20 is shown on an enlarged scale in FIG. 6. The inwardly directed hook member 20 is moulded onto the end of the partially illustrated clip segment 8.

The hook member 20 is composed of two hook member halves 21, 22 lying side by side and adjoining each other, which hook member halves are staggered slightly relative to each other. Each hook member half 21, 22 forms a hook surface half 23a, 23b, which hook surface halves 23a, 23b extend transversely to the closing direction of the clip segments 7, 8.

The hook surface halves 23a, 23b are staggered relative to each other in the closing direction. Between the hook surface halves 23a, 23b the side edge of the hook member half 21 forms a first stop surface 24 of the hook member 20 concerned.

Each hook member half 21, 22 further forms a slanting run-on surface half 25a, 25b of the hook member 20. In this example said run-on surface halves 25a, 25b form a single smooth run-on surface without step in the centre.

Each hook member half 21, 22 further forms a corresponding boundary surface half 26a, 26b. These boundary surface halves 26a, 26b extend—viewed from the end of the clip segment 8 towards the pivoting connecting part 5—from the outside end of the hook surface halves and connect to the approximately semicircular inside surface of the clip element 8.

The boundary surface halves 26a, 26b are situated staggered relative to each other, in such a way that a second stop surface 27 of the hook member 20 concerned extends between the boundary surface halves 26a, 26b.

The first and second stop surfaces 23a,b and 27a,b of the hook member 20 lie in a common imaginary plane.

When the pipe clip 1 is being closed the hook member 20 slides over the run-on surface 15a, 15b until the hook surfaces of the hook members 10 and 20 concerned engage behind each other.

In the first closed state of the pipe clip (see FIGS. 3 and 7) the hook surface halves 13a, 13b hook up behind the hook surface halves 23a, 23b of the hook member 20. The run-on surface halves 15a, 15b of the hook member 10 also rest against the boundary surface halves 26a, 26b of the hook member 20.

Figure 7:
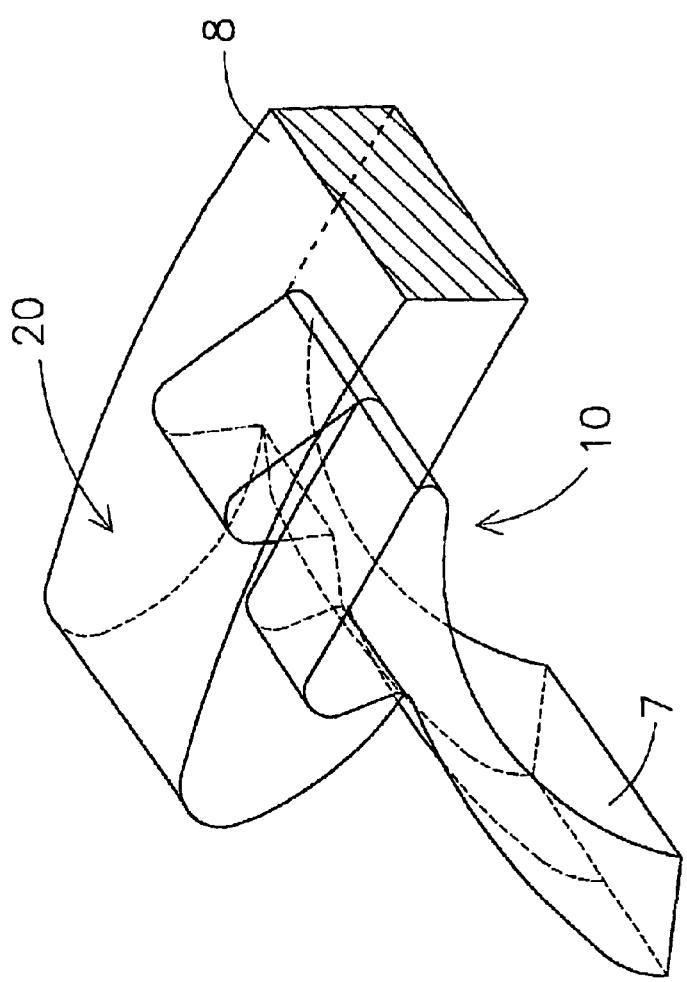
FIG. 7 shows diagrammatically in perspective the hook members of FIGS. 5 and 6 in the first closed position of the pipe clip according to FIG. 3.

In the illustration of FIG. 7 it can be seen that the stop surfaces 13a,b and 23a,b lie alongside each other and that the stop surfaces 17, 27 also lie alongside each other. This ensures that—in the closed state of the hook closure—the first stop surfaces 14, 24 block a mutual lateral shifting of the hook members in a sideways direction in the plane of the hook surfaces, and that the second stop surfaces 17, 27 block mutual shifting of the hook members 10, 20 in the opposite direction.

The hook member 30 is designed substantially in the same way as the hook member 20, so that no further explanation will be given here. Again, if the hook member 10 is in engagement with the hook member 30, mutual shifting of said hook members 10, 30 in directions extending transversely to the direction of closing is blocked by the interacting stop surfaces of the two hook members 10, 30.

FIG. 5 shows diagrammatically a first mould part 101, a second mould part 102, and a third mould part 103 of a mould for injection moulding the pipe clip 1 from suitable plastic material.

The mould parts 101, 102, 103 together bound a mould cavity for the end of the pipe segment 7, on which the hook member 10 is provided.

In this case the mould cavity in the mould part 101, which is bounded on the inner circumference by the mould part 103, defines the left hook member half 11. The mould cavity in the mould part 102, which is likewise bounded on the inner circumference by the mould part 103, defines the right hook member half 12. The partial surface 104 with which the mould parts 101,102 lie firmly against each other during the injection moulding coincides here with the common surface of the first and second stop surface 14, 17 of the hook member 10 to be produced.

It will be clear that the mould for forming the other clip segment 8 with the corresponding hook members 20, 30 will also have several mould parts, possibly—in a practical embodiment of the mould—the same mould parts 101, 102, 103. In this case a mould part then forms the left hook member half 21 and the mould part lying against it forms the right hook member half 22. The halves of the hook member 30 are achieved in the same way.

In practice, a burr 105 will be visible on the clip segment 7, on the outside. In FIG. 2 the same burr formation can be seen on the other side of the pipe clip 1 (burr 106), since the clip segment 8 and the hook members 20, 30 are also produced in this way. There again, the partial surface of the mould parts lying against each other coincides with the stop surfaces 24 of the hook members 20 and 30.

What is claimed is:

1. A one-piece pipe clip comprising a base part;
   a. a first upright arm and a second upright arm, the first upright arm connected by a first pivoting connecting part to a first clip segment and the second upright arm connected by a second pivoting connecting part to a second clip segment;
   b. the first clip segment has a first substantially semicircular bearing surface and the second clip segment has a second substantially semicircular bearing surface for a pipe, the first bearing surface faces away from the second bearing surface;
   c. the first and second clip segments are fitted onto the base part by way of the first and second pivoting connecting parts such that the first and second clip segments enclose a pipe when the pipe is pressed towards the base part between the clip segments;
   d. the first clip segment provided with an outwardly directed first hook member and the second clip segment provide with an inwardly directed second hook member;
   e. each hook member being composed of a first hook member half and a second hook member half, wherein said first and second hook member halves of each hook member lie side by side and adjoining each other, and are staggered slightly relative to each other;
   f. wherein each first and second hook member half of each hook member forms a hook surface half, which hook surface halves of each hook member extend transversely to the closing direction of the clip segments;
   g. wherein the hook surface halves of each hook member are staggered relative to each other in the closing direction;
   h. between the hook surface halves of each hook member, the side edge of the first hook member half of each hook member forms a first stop surface of each of the hook member;
   i. each first and second hook member half of each hook member forms a slanting run-on surface half; and
   j. a second stop surface extends between the run-on surface halves of each hook member and the run-on surface halves of each hook member situated staggered relative to each other.

2. The pipe clip according to claim 1, wherein the first and second stop surfaces of each hook member extend in a single common plane.

3. A method for making a pipe clip according to claim 2 comprising producing the first clip segment and the second clip segment by injection molding of plastic material in a suitable mold, which mold comprises a first mold part and a second mold part, which mold parts respectively define said mold cavity for a first hook member half and for said second hook member half of said hook member wherein the mold parts during injection molding rest against each other by means of a partial face;

the partial face coinciding with the common face of the first and the second stop surface of the hook member concerned.

* * * * *